(12) United States Patent
Shilane et al.

(10) Patent No.: US 9,235,475 B1
(45) Date of Patent: *Jan. 12, 2016

(54) METADATA OPTIMIZATION FOR NETWORK REPLICATION USING REPRESENTATIVE OF METADATA BATCH

(71) Applicant: EMC Corporation, Hopkinton, MA (US)

(72) Inventors: Philip Shilane, Yardley, PA (US); Grant Wallace, Pennington, NJ (US)

(73) Assignee: EMC Corporation, Hopkinton, MA (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/786,270

(22) Filed: Mar. 5, 2013

(51) Int. Cl.
G06F 11/14 (2006.01)
G06F 17/30 (2006.01)

(52) U.S. Cl.
CPC ........ G06F 11/1453 (2013.01); G06F 11/1448 (2013.01); G06F 17/30156 (2013.01); G06F 17/30159 (2013.01)

(58) Field of Classification Search
CPC ............ G06F 11/1448; G06F 11/1453; G06F 11/1458; G06F 17/3015; G06F 17/30156; G06F 17/30159; G06F 3/0641; G06F 3/0646
See application file for complete search history.

(56) References Cited

U.S. PATENT DOCUMENTS

| | | | |
|---|---|---|---|
| 6,085,321 A | 7/2000 | Gibbs et al. | |
| 6,349,296 B1 | 2/2002 | Broder et al. | |
| 6,374,250 B2 | 4/2002 | Ajtai et al. | |
| 7,170,886 B1 * | 1/2007 | Surazski et al. | 370/352 |
| 8,099,549 B1 | 1/2012 | Madnani et al. | |
| 8,667,032 B1 * | 3/2014 | Shilane et al. | 707/825 |
| 8,849,772 B1 | 9/2014 | Huang et al. | |
| 8,892,528 B2 * | 11/2014 | Rao | G06F 3/0641 707/687 |
| 9,026,740 B1 * | 5/2015 | Shilane et al. | 711/137 |
| 9,047,304 B2 * | 6/2015 | Yakushev | G06F 17/30159 |
| 2005/0131939 A1 | 6/2005 | Douglis et al. | |
| 2005/0235043 A1 | 10/2005 | Teodosiu et al. | |
| 2008/0005141 A1 * | 1/2008 | Zheng | G06F 3/0641 |
| 2008/0256143 A1 | 10/2008 | Reddy et al. | |

(Continued)

OTHER PUBLICATIONS

Chan, Mun Choon et al., "Cache-based Compaction: A New Technique for Optimizing Web Transfer," INFOCOM '99, Eighteenth Annual Joint Conference of the IEEE Computer and Communications Societies, Proceedings, Mar. 21-25, 1999, 9 pages.

(Continued)

Primary Examiner — Ramy M Osman
(74) Attorney, Agent, or Firm — Blakely, Sokoloff, Taylor & Zafman LLP

(57) ABSTRACT

In one embodiment, in response to a list of a plurality of fingerprints representing data chunks to be replicated from a source storage system to a target storage system over a network, one of the fingerprints is selected as a representative fingerprint that matches selection criteria. The source storage system generates a fingerprint representation for each of the fingerprints that is smaller than the corresponding fingerprint. The representative fingerprint and the fingerprint representations are transmitted to the target storage system over the network, without transmitting all full fingerprints of the data chunks, to allow the target storage system identifying which of the data chunks are missing. In response to information received from the target storage system indicating one or more data chunks that are missing at the target storage system, the missing data chunks are then transmitted to the target storage system.

21 Claims, 10 Drawing Sheets

(56) References Cited

U.S. PATENT DOCUMENTS

| | | | |
|---|---|---|---|
| 2009/0213270 A1* | 8/2009 | Ismert et al. .................. | 348/575 |
| 2009/0276454 A1* | 11/2009 | Smith ............... | G06F 17/30162 |
| 2009/0300321 A1* | 12/2009 | Balachandran ....... | G06F 12/023 |
| | | | 711/216 |
| 2010/0049735 A1* | 2/2010 | Hsu .................. | G06F 17/30138 |
| | | | 707/E17.005 |
| 2010/0125553 A1 | 5/2010 | Huang et al. | |
| 2010/0306412 A1 | 12/2010 | Therrien et al. | |
| 2011/0196900 A1 | 8/2011 | Drobychev et al. | |
| 2012/0324029 A1* | 12/2012 | Fogel et al. .................... | 709/206 |
| 2013/0054544 A1* | 2/2013 | Li ..................... | G06F 17/30159 |
| | | | 707/693 |
| 2013/0212074 A1* | 8/2013 | Romanski ......... | G06F 17/30156 |
| | | | 707/692 |
| 2013/0311638 A1* | 11/2013 | Lord ............................. | 709/224 |
| 2014/0074794 A1* | 3/2014 | Chavda et al. ................ | 707/679 |

OTHER PUBLICATIONS

Jain, Navendu et al., "TAPER: Tiered Approach for Eliminating Redundancy in Replica Synchronization," FAST '05, 4th USENIX Conference on File and Storage Technologies, Dec. 13-16, 2005, 14 pages.

Muthitacharoen, Athicha et al., "A Low-bandwidth Network File System," SOSP '01, Proceedings of the Eighteenth ACM Symposium on Operating Systems Principles, Oct. 21-24, 2001, 14 pages.

Spring Neil T. et al., "A Protocol-Independent Technique for Eliminating Redundant Network Traffic," SIGCOMM '00, Proceedings of the Conference on Applications, Technologies, Architectures, and Protocols for Computer Communication, Aug. 28-Sep. 1, 2000, 9 pages.

Non-Final Office Action, U.S. Appl. No. 13/786,277, dated Jan. 13, 2015, 21 pages.

Chan, Mun Choon, et al, "Cache-based Compaction: A New Technique for Optimizing Web Transfer," INFOCOM '99, Eighteenth Annual Joint Conference of the IEEE Computer and Communications Societies, Proceedings, Mar. 21-25, 1999, 9 pages.

Jain, Navendu, et al, "TAPER: Tiered Approach for Eliminating Redundancy in Replica Synchronization,"FAST '05, 4th USENIX Conference on File and Storage Technologies, Dec. 13-16, 2005, 14 pages.

Muthitacharoen, Athicha, et al, "A Low-bandwidth Network File System," SOSP '01, Proceedings of the Eighteenth ACM Symposium on Operating Systems Principles, Oct. 21-24, 2001, 14 pages.

Spring, Niel T, et al, "A Protocol-Independent Technique for Eliminating Redundant Network Traffic," SIGCOMM '00, Proceedings of the Conference on Applications, Technologies, Architectures, and Protocols for Computer Communication, Aug. 28-Sep. 1, 2000, 9 pages.

\* cited by examiner

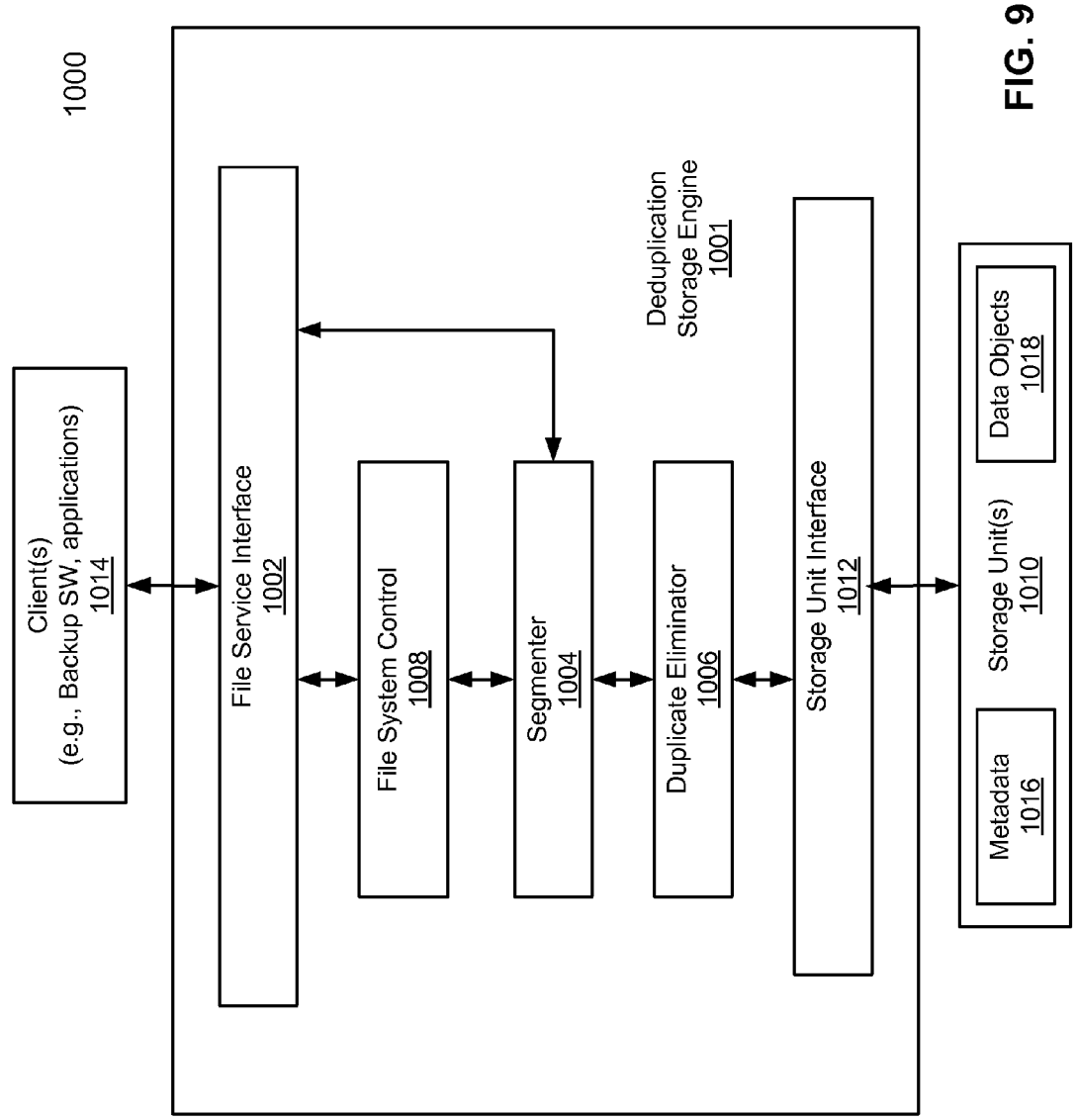

US 9,235,475 B1

METADATA OPTIMIZATION FOR NETWORK REPLICATION USING REPRESENTATIVE OF METADATA BATCH

RELATED APPLICATIONS

This application is related to co-pending U.S. patent application Ser. No. 13/786,277, entitled "Metadata Optimization for Network Replication using Differential Encoding," filed Mar. 5, 2013, which is incorporated by reference in its entirety.

FIELD OF THE INVENTION

Embodiments of the present invention relate generally to data storage systems. More particularly, embodiments of the invention relate to metadata optimization for network replication using representative of metadata batch.

BACKGROUND

Replication is a critical feature for disaster recovery appliances. There are numerous configurations where data are transmitted across the network for disaster recovery purposes: pairs of office protecting each other, satellite offices transmitting to headquarters, and satellite offices transmitting to relay stations that consolidate and then transmit to one or more national data centers. Communication may occur over low bandwidth links because customers are located in inhospitable locations such as offshore or in forests. The goal for disaster recovery purposes is to improve data compression during replication so more data can be protected within a backup window.

The challenge is to transfer all of the logical data (e.g., all files within the retention period) while reducing the transmission as much as possible. Storage appliances achieve high compression by transferring metadata that can reconstruct all of the files based on strong fingerprints of data chunks followed by the unique data chunks. Since there is often a large amount of redundancy within backup data sets, even within modified files, 10× or greater compression can be achieved by only sending unique data chunks. A data chunk or simply chunk is a partition of data used in the deduplication process. Prior to storing a file in a storage, the file is segmented using a chunking algorithm into multiple chunks and only the non-duplicate chunks are stored. A fingerprint of a chunk is used to represent or identify a chunk. A fingerprint of a chunk is generated by hashing content of chunk using a hash function such as SHA-1 or MD5.

FIG. 1 is a block diagram illustrating a conventional method of data replication over a network. Referring to FIG. 1, typically, a source storage system transmits to a target storage system a list of fingerprints presenting data chunks for replication. A fingerprint may be generated by hashing at least a portion of content of a data chunk. The target storage system then determines which of the data chunks that have been stored locally based on the fingerprints. The target storage system then replies with a list of one or more fingerprints representing one or more data chunks that are not stored locally. The source storage system then transmits the missing data chunks to the target storage accordingly. As the deduplication rate improves, the amount of data chunks transmitted over the network can be reduced. However, a significant amount of fingerprints (also referred to as metadata) may still be transmitted over the network. Fingerprints become a larger percentage of the data transmitted over the network.

BRIEF DESCRIPTION OF THE DRAWINGS

Embodiments of the invention are illustrated by way of example and not limitation in the figures of the accompanying drawings in which like references indicate similar elements.

FIG. 9 is a block diagram illustrating a deduplicated storage system according to one embodiment of the invention.

DETAILED DESCRIPTION

Figure 1:
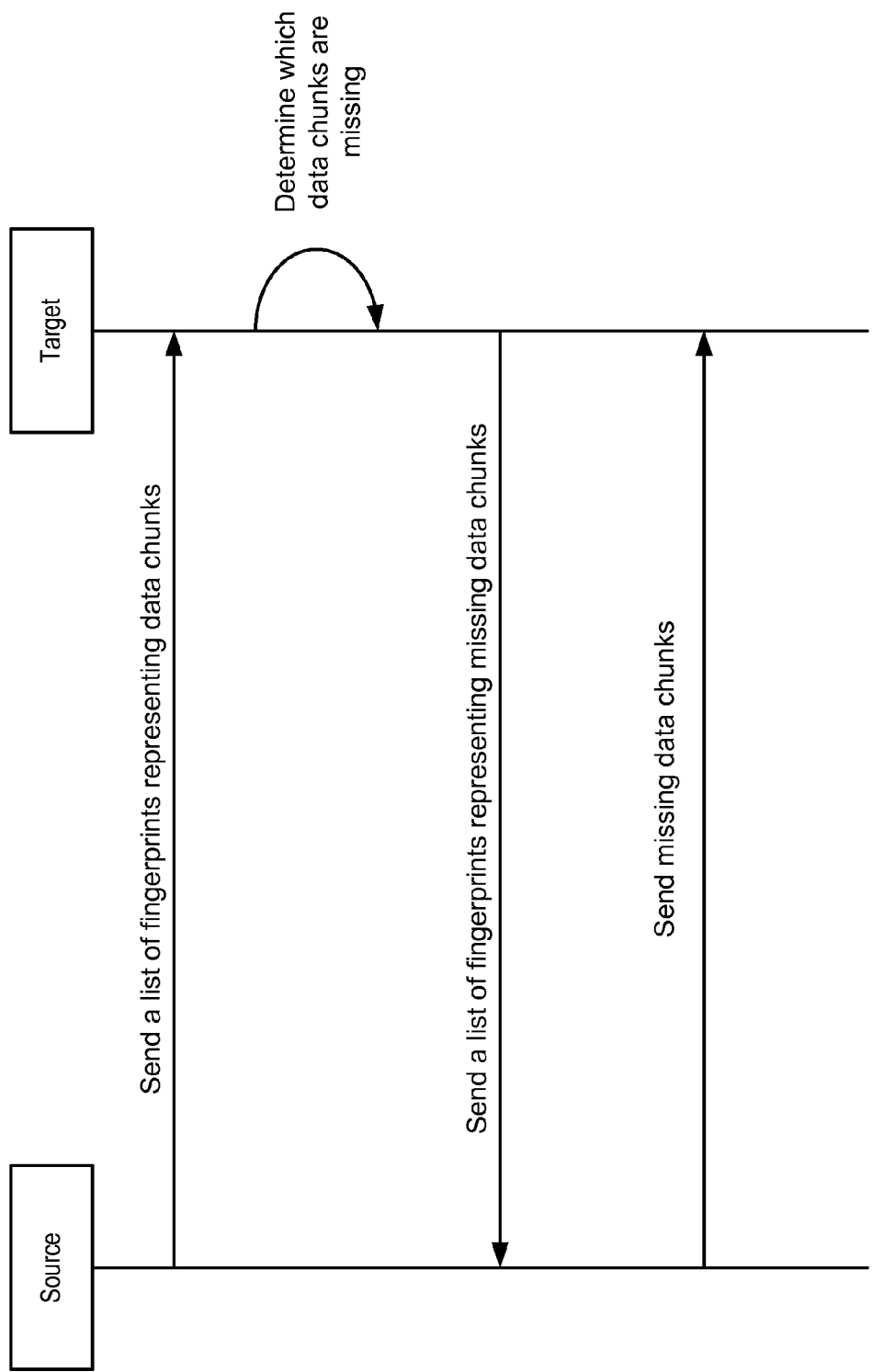
FIG. 1 is a block diagram illustrating a method of a conventional network replication.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for optimizing transfer of metadata are described herein. According to one embodiment, fingerprints of a batch of data chunks are analyzed by a source storage system to select a representative fingerprint amongst the fingerprints of the batch according to predetermined selection criteria. A batch consists of either a fixed or variable number of consecutive chunks or fingerprints depending on the specific situations. The data chunks are to be replicated from the source storage system to a target storage system. A fingerprint representation (also referred to as short fingerprint or meta-fingerprint) is generated for each of the fingerprints of the batch, where a fingerprint representation is less or shorter than the corresponding full fingerprint. The representative fingerprint and the fingerprint representations are then transmitted from the source storage system to the target storage system, without having to transmit all of the full fingerprints of the data chunks. The target storage system attempts to recover full fingerprints as much as possible based on the representative fingerprint and the fingerprint representations. If there is any fingerprint that is missing at the target storage system, the target storage system transmits information, such as a bitmask or bit vector, to the source storage system indicating which of the fingerprints are missing. In addition, the target may further optionally send a hash of the reconstructed fingerprints back to the source for confirmation of the reconstruction of the fingerprints. The source storage system then transmits the missing fingerprints to the target storage system. Based on all the fingerprints of the batch, the target storage system determines which of the data chunks have been stored in the target storage system and only the data chunks that have not been previously received at the target storage system are needed to be transmitted from the source storage system. As a result, an amount of fingerprints transmitted over a network can be greatly reduced.

According to another embodiment, a source storage system and/or a target storage system may maintain information concerning previously transmitted and/or received batches at the source and/or target storage systems, respectively. When the source storage system is to replicate a first batch of one or more data chunks to the target storage system, the source storage system identifies a second batch based on one or more fingerprints of the first batch or based on the corresponding data chunks directly, where the second batch is similar to the first batch and the second batch has been previously transmitted to the target storage system. The source storage system then determines a difference between the fingerprints of the first batch and the second batch and encodes the difference into differential encoding information. The differential encoding information includes a batch identifier (ID) identifying the previously transmitted second batch and one or more fingerprints that are missing in the second batch. The source storage system then transmits the differential encoding information (without transmitting all of the full fingerprints of the first batch) to the target storage system to allow the target storage system to recover or reconstruct the fingerprints of the first batch based on the second batch and the one or more fingerprints carried within the differential encoding information. Thereafter, the normal data chunk deduplication process is performed. As a result, an amount of fingerprints transmitted over a network can be greatly reduced. Note that throughout this application, a fingerprint is utilized as an example of metadata and a deduplicated storage system is utilized as a storage system. However, it is not so limited; the techniques described herein can also be applied to other metadata and other types of storage systems.

Figure 2:
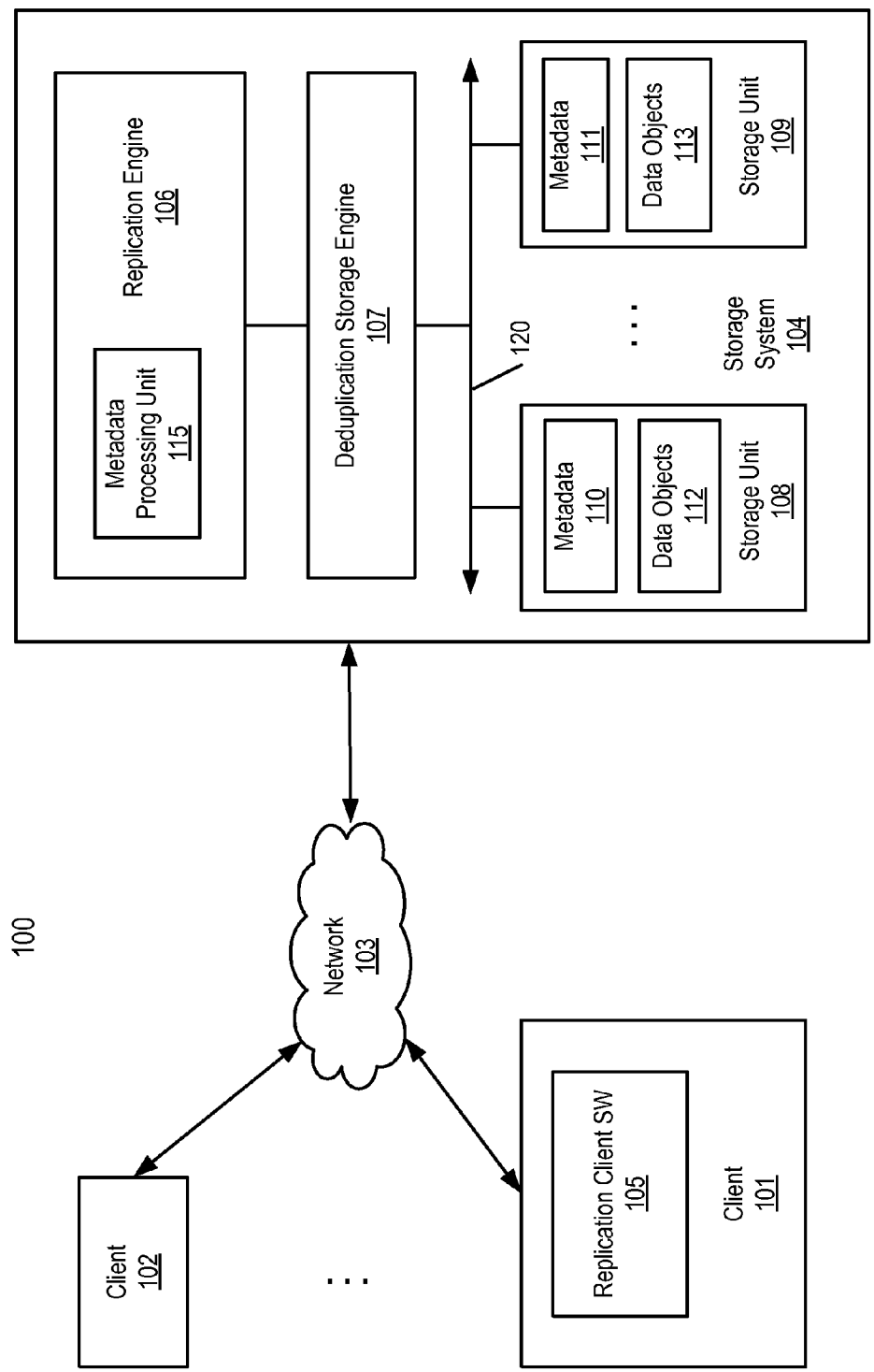
FIG. 2 is a block diagram illustrating a storage system according to one embodiment of the invention.

FIG. 2 is a block diagram illustrating a storage system according to one embodiment of the invention. Referring to FIG. 2, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof. Clients 101-102 may represent a source storage system having a replication or backup client software such as replication client 105 to replicate data from the source storage system to a target storage system such as storage system 104.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, replication or backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. Storage system 104 may be target storage system to received data replicated or backed up from a client storage system such as storage systems 101-102.

In response to a data file to be stored (e.g., backed up or replicated) in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains. Replication engine 106 and deduplication storage engine 107 may be implemented as an integrated unit or component.

According to one embodiment, as an example of a source storage system, when client 101 is configured to replicate a batch of data chunks to storage system 104 as a target, replication client 105 analyzes fingerprints of the batch of data chunks to select a representative fingerprint amongst the fingerprints of the batch according to predetermined selection criteria. Replication client 105 generates a fingerprint representation for each of the fingerprints of the batch, where a fingerprint representation is less or shorter than the corresponding full fingerprint. The representative fingerprint and the fingerprint representations are then transmitted from client 101 to storage system 104, without having to transmit all of the full fingerprints of the data chunks. The storage system 104 attempts to recover full fingerprints as much as possible based on the representative fingerprint and the fingerprint representations. In addition, the target may further optionally send a hash of the reconstructed fingerprints back to the source for confirmation of the reconstruction of the fingerprints. If there is any fingerprint that is missing at storage system 104, storage system 104 transmits information, such as a bitmask or bit vector, to client 101 indicating which of the fingerprints are missing. Client 101 then transmits the missing fingerprints to storage system 104. Based on all the fingerprints of the batch, storage system 104 determines which of the data chunks have been stored in storage system 104 and only the data chunks that have not been previously received at storage system 104 are needed to be transmitted from client 101. As a result, an amount of fingerprints transmitted over a network can be greatly reduced.

According to another embodiment, client 101 and/or storage system 104 may maintain information concerning previously transmitted and/or received batches at client 101 and/or storage system 104, respectively. When client 101 is to replicate a first batch of one or more data chunks to storage system 104, client 101 identifies a second batch based on one or more fingerprints of the first batch, where the second batch is similar to the first batch and the second batch has been previously transmitted to storage system 104. Note that one or more batches previously transferred to storage system 104 can be identified and used for difference encoding. It does not have to be limited to one batch. Client 101 then determines a difference between the fingerprints of the first batch and the second batch and encodes the difference into differential encoding information. The differential encoding information includes a batch identifier (ID) identifying the previously transmitted second batch and one or more fingerprints that are missing in the second batch. The source storage system then transmits the differential encoding information (without transmitting all of the full fingerprints of the first batch) to storage system 104 to allow storage system 104 to recover or reconstruct the fingerprints of the first batch based on the second batch and the one or more fingerprints carried within the differential encoding information. Thereafter, the normal data chunk deduplication process is performed. As a result, an amount of fingerprints transmitted over a network can be greatly reduced.

Figure 3A:
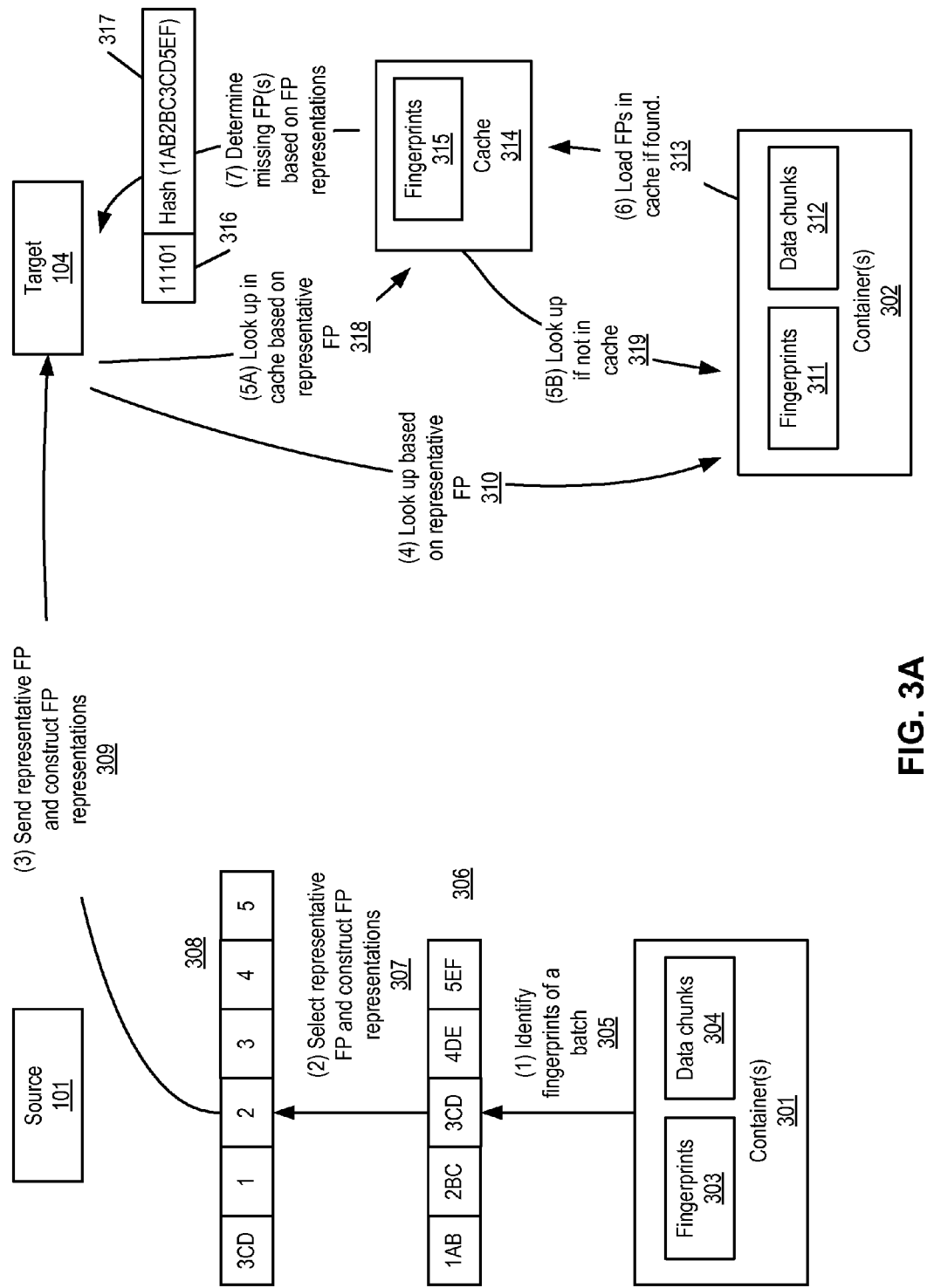
FIGS. 3A and 3B are processing diagrams illustrating a process of optimizing metadata for network replication according to one embodiment of the invention.
Figure 3B:
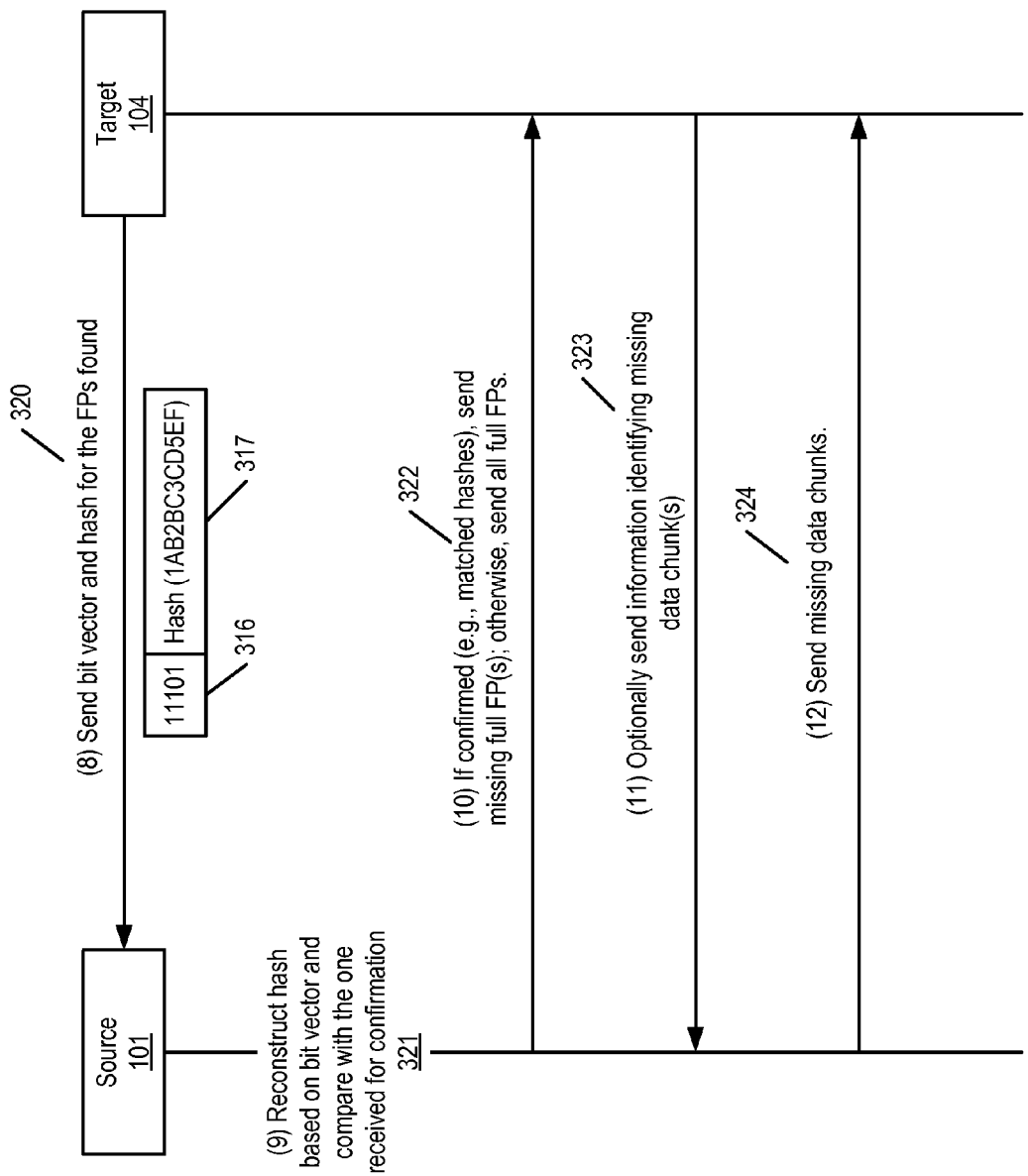

FIGS. 3A and 3B are processing diagrams illustrating a process of optimizing metadata for network replication according to one embodiment of the invention. Referring to FIG. 3A, source 101 can represent any of clients 101-102 of FIG. 2 while target 104 can represent storage system 104 of FIG. 2. When a batch or group of data chunks, which may be part of data chunks 304 stored in one or more containers 301 of source 101, is to be replicated from source 101 to target 104, fingerprints 306 of the data chunks of the batch are identified via transaction 305, where fingerprints 306 may be identified and retrieved from fingerprints 303 stored in container(s) 301.

A batch may represent one or more data chunks. A batch can be created to present a fixed numbers of data chunks (e.g., 128, 256, etc.). A batch can also be created to represent a fixed amount of data in bytes (e.g., 1 MB, 4 MB, etc.). A batch can also represent a variable number of data chunks that are determined based on a content-defined manner, for example, where the chunk boundaries are determined based on some anchoring techniques.

In this example, fingerprints 306 include five fingerprints representing five data chunks: 1AB, 2BC, 3CD, 4DE, and 5EF. At transaction 307, processing logic selects one of the fingerprints 306 as a representative fingerprint (e.g., a full fingerprint) according to predetermined selection criteria. For example, a fingerprint may be selected as a representative fingerprint if it has been previously sent to the target and if at least a portion of the fingerprint matches a predetermined pattern (e.g., bit pattern). Alternatively, a fingerprint may be selected as a representative fingerprint if it is the lowest or highest fingerprint amongst fingerprints 306. Furthermore, a fingerprint may be selected as a representative fingerprint if it is the first or last overall in the list amongst fingerprints 306 representing the batch. Other criteria may also be utilized. For the purpose of illustration, it is assumed that fingerprint 3CD is selected as a representative fingerprint.

According to one embodiment, for each of the fingerprints, a fingerprint representation, also referred to as a short or partial fingerprint, is created based on the corresponding full fingerprint. A fingerprint representation includes only a portion of the corresponding full fingerprint, such as, for example, a prefix of the corresponding fingerprint. In this example, fingerprint information 308 is created including representative fingerprint 3CD and five fingerprint representations "1," "2," "3," "4," and "5." In this example, fingerprint representation "1" is part of fingerprint 1AB; fingerprint representation "2" is part of fingerprint 2BC; fingerprint representation "3" is part of fingerprint 3CD; fingerprint representation "4" is part of fingerprint 4DE; and fingerprint representation "5" is part of fingerprint 5EF. Fingerprint information is then transmitted via transaction 309 to target 104.

In response to fingerprint information 308, target 104 looks up based on representative fingerprint (e.g., 3CD) to identify via transaction 310 one of the containers 302 associated with target 104. In one embodiment, processing logic may perform a lookup in a fingerprint-to-container (FP/container) index to locate a container identifier (ID) based on the representative fingerprint received from source 101. In one embodiment, the processing logic may apply a bloom filter to the representative fingerprint to identify one of the containers 302. A Bloom filter is a space-efficient probabilistic data structure that is used to test whether an element is a member of a set. False positive retrieval results are possible, but false negatives are not; i.e. a query returns either "inside set (may be wrong)" or "definitely not in set". Elements can be added to the set, but not removed (though this can be addressed with a counting filter). The more elements that are added to the set, the larger the probability of false positives.

Referring back to FIG. 3A, once the container has been identified and located, processing logic loads, via transaction 313, at least a portion of fingerprints (which are part of fingerprints 311) associated with the identified container into cache 314 as part of fingerprints 315. Based on fingerprints 315, processing logic performs a search based on the fingerprint representations (e.g., short fingerprints) to determine whether the corresponding full fingerprints are found in fingerprints 315, for example, by matching the fingerprint representations with the cached full fingerprints. As described above, a fingerprint representation includes a portion of the corresponding full fingerprint. For example, a fingerprint representation may be a prefix (e.g., 3-5 bytes) of the corresponding full fingerprint (e.g., 20 bytes). Longer prefixes used as fingerprint representation can lead to a more accurate matching result, but it would require more bandwidth. Shorter prefixes as fingerprint representations can reduce the bandwidth requirement, but it may increase chances of collision (e.g., false matching). In one embodiment, a representative fingerprint is selected in a manner such that the rest of the fingerprints in the batch may more likely be stored in the same container as the representative fingerprint.

In one embodiment, processing logic generates a bit vector or bitmask having multiple bits each representing one of the fingerprints represented by fingerprint information 308. A logical bit value of each bit indicates whether the corresponding fingerprint has been found in target 104. For example, a logical value of one or TRUE indicates that the corresponding fingerprint has been previously received by target 104, and a logical value of zero or FALSE indicates that the corresponding fingerprint has not been found by target 104. In this example, it is assumed fingerprint 4DE has not been found in fingerprints 315 based on the fingerprint representation "4" while the rest of the fingerprints 1AB, 2BC, 3CD, and 5EF are found. As a result, target 104 generates bitmask 316 having a bit pattern of "11101" in which the logical value of zero at the fourth bit location from the left indicates that fingerprint 4DE is absent at target 104.

In addition, target 104 generates fingerprint confirmation value 317 based on the fingerprints that are found from cached fingerprints 315. In one embodiment, the fingerprint confirmation value is generated by hashing the found fingerprints, in this example, hash of "1AB2BC3CD5EF" (except the missing fingerprint 4DE). The order of the combined fingerprint corresponds to the bit order of the bitmask, which also corresponds to the fingerprint order represented by fingerprint information 308 received from source 101. Note that the matching of fingerprint representations and the actual fingerprints can only indicate that it is more likely than not that the matched fingerprints are the same fingerprints in source 101 represented by the fingerprint representations. It is also possible that there is a collision on a fingerprint representation in which multiple fingerprints match the same fingerprint representation, since the fingerprint representation is generated based on only a portion of a full fingerprint. The fingerprint confirmation value can optionally be used by the source 101 to confirm whether the matched fingerprints are indeed the same fingerprints represented by the fingerprint representations.

According to another embodiment, when target 104 receives fingerprint information 308 from source 101 via transaction 309, instead of directly looking up containers 302 via transaction 310, target 104 performs a lookup via transaction 318 at cache 314 to determine whether the fingerprints represented by the fingerprint representations are currently cached in cache 314. If no matched fingerprints are found in cache 314, target 104 then performs a lookup in containers 302 via transaction 319. In one embodiment, target 104 may selectively (e.g., alternately) performing lookups via path 310 or paths 318-319.

Referring now to FIG. 3B, target 104 transmits the fingerprint confirmation information to source 101 via transaction 320, where the confirmation information includes bitmask 316 and confirmation value 317. In response at transaction 321, based on bitmask 316, source 101 reconstruct a local confirmation value using the fingerprints stored locally (e.g., fingerprints 306 of FIG. 3A). Source 101 can reconstruct the fingerprints because it knows which of the fingerprints and the order of the fingerprints bitmask 316 represents since they match the order of fingerprints 306 source 101 originally sent. The locally generated confirmation value is then compared with the confirmation value 317 received from target to determine whether target possesses the fingerprints represented by bitmask 316. If both confirmation values match, it means that target indeed has the fingerprints represented by bitmask 316, in which case, source 101 sends only the missing fingerprints to target 104 via transaction 322. If the confirmation values do not match, it means that it cannot confirm that target 104 has the exact fingerprints, in which case, source 101 sends the entire fingerprints over. Based on all of the fingerprints, target 104 determines which of the data chunks are missing and optionally sends information identifying the missing data chunks to source 101 via transaction 323. The information could be the fingerprints of the missing data chunks or a bit vector representing the missing data chunks (since source knows the order of the bits in the vector). Source 101 then sends the missing data chunks over via transaction 324.

Figure 4:
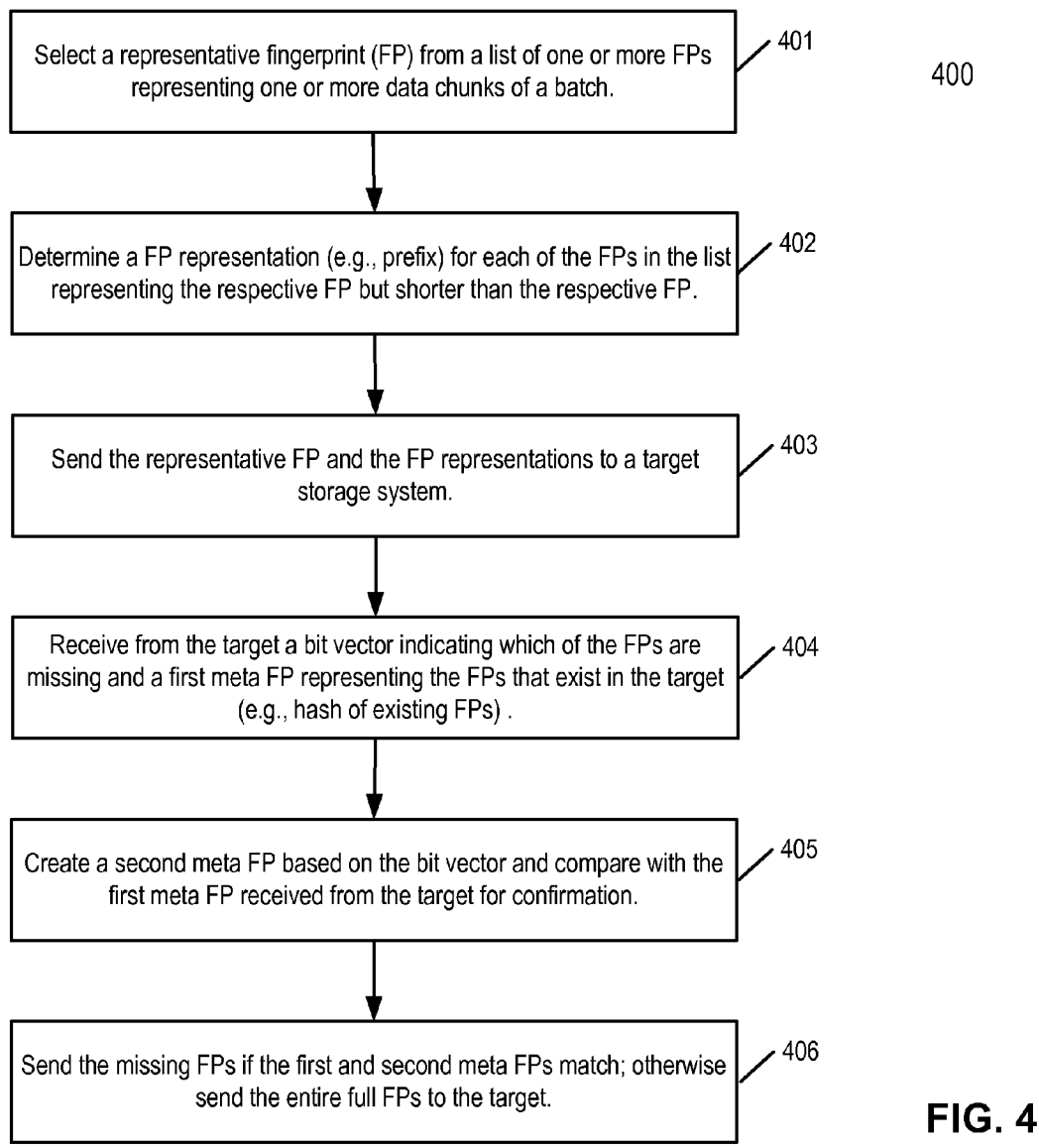
FIG. 4 is a flow diagram illustrating a method of optimizing metadata for network replication according to one embodiment of the invention.

FIG. 4 is a flow diagram illustrating a method of optimizing metadata for network replication according to one embodiment of the invention. Method 400 may be performed by source 101 of FIGS. 3A and 3B, which may include processing logic in software, hardware, or a combination thereof. Referring to FIG. 4, at block 401, processing logic selects a representative fingerprint from a list of one or more fingerprints representing one or more data chunks of a batch or group. At block 402, for each of the fingerprints, processing logic determines a fingerprint representation (e.g., prefix) for representing the corresponding fingerprint, but less or shorter than the corresponding fingerprint. At block 403, processing logic sends fingerprint information having the representative fingerprint and the fingerprint representations to a target over a network, without having to send all full fingerprints to the target except the representative fingerprint. The target may recover the full fingerprints from the fingerprint representations as described above. At block 404, the source receives from the target a bitmask or bit vector indicating which of the fingerprints missing at the target and a first meta fingerprint (e.g., a fingerprint of fingerprints) representing the fingerprint(s) that the target currently has. The first meta fingerprint may be a hash of the fingerprints (e.g., a hash of concatenated fingerprints) currently possessed by the target. At block 405, based on the bitmask, the source creates a second meta fingerprint and compares the second meta fingerprint with the first meta fingerprint received from the target. If they match, at block 406, the source sends only the missing full fingerprints to the target; otherwise, it sends all full fingerprints to the target.

Figure 5:
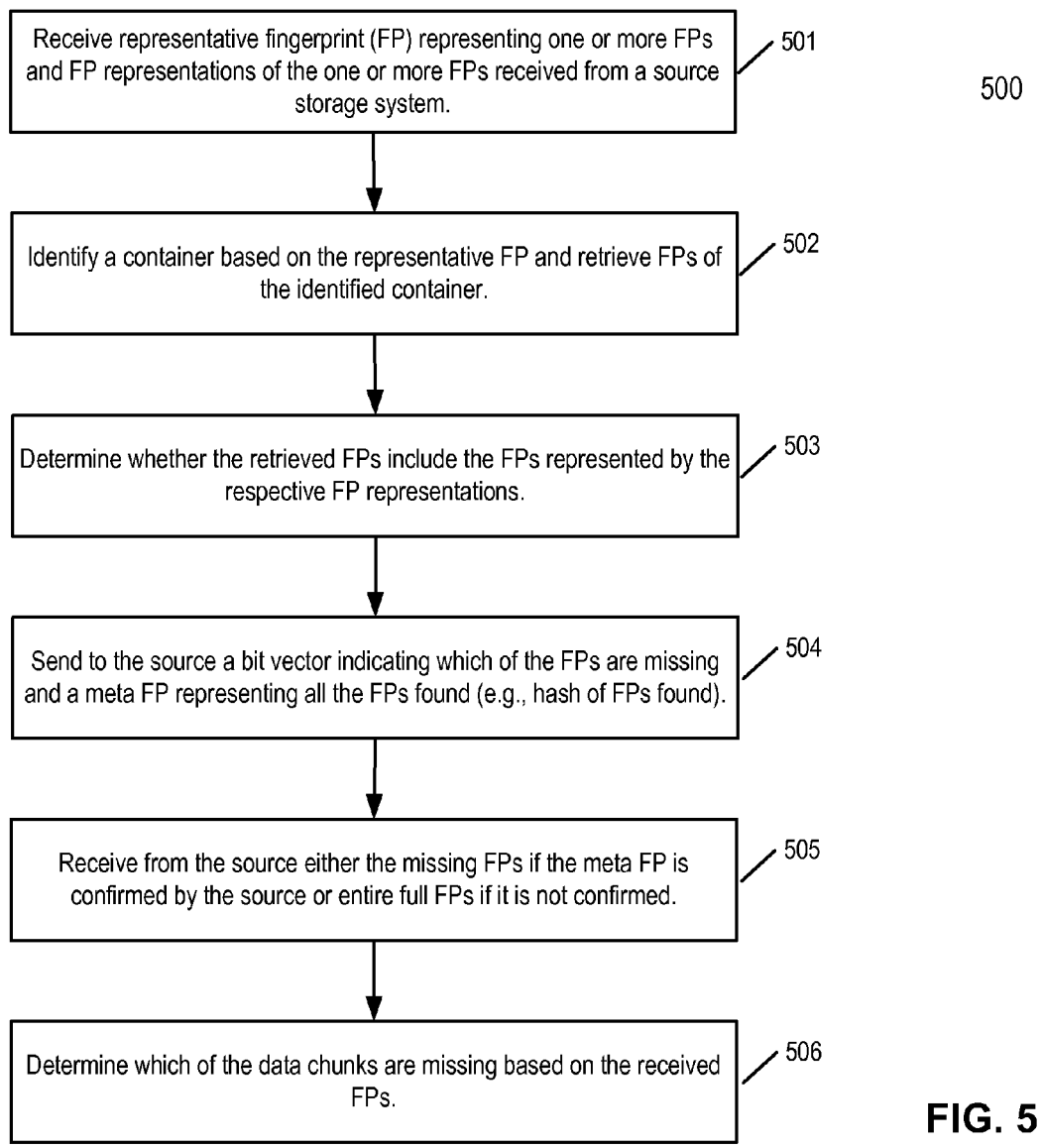
FIG. 5 is a flow diagram illustrating a method of optimizing metadata for network replication according to another embodiment of the invention.

FIG. 5 is a flow diagram illustrating a method of optimizing metadata for network replication according to one embodiment of the invention. Method 500 may be performed by target 104 of FIGS. 3A and 3B, which may include processing logic in software, hardware, or a combination thereof. Referring to FIG. 5, at block 501, processing logic receives a representative fingerprint and fingerprint representations representing one or more fingerprints of one or more data chunks from a source storage system for data replication. At block 502, based on the representative fingerprint, processing logic identifies a storage location and retrieves metadata (e.g., fingerprints) from the storage location representing data chunks stored therein. In one embodiment, the storage location may be storage container storing data chunks (e.g., deduplicated data chunks). The fingerprints may then be loaded in a memory of the target such as a cache memory. At block 503, processing logic searches the fingerprints retrieved from the storage location based on the fingerprint representations received from the source to determine whether any of the fingerprints represented by the fingerprint representations exist in the target. At block 504, processing logic sends source a bit vector indicating which of the fingerprints are missing (or exist) at the target and a meta fingerprint representing all of the fingerprints found in the target. The meta fingerprint is used by the source to confirm whether the target indeed has the fingerprints the target thought it has. At block 505, processing logic receives from the source either the missing fingerprints if the meta fingerprint has been confirmed by the source, or entire full fingerprints if the meta fingerprint cannot be confirmed by the source. At block 506, processing logic then determine which of the data chunks are missing based on the full fingerprints and may request the source to send over the missing data chunk(s) if there is any.

According another embodiment, the source and/or target keeps track of the fingerprints and/or data chunks of batches or groups that have been transmitted and/or received with each other. When a new batch is to be replicated from a source to a target, instead of sending the fingerprints again to the target, the source may send information identifying a previously sent batch and differential encoding information representing the difference between fingerprints of the current batch and the previous batch, where the target is to reconstruct the fingerprints of the current batch based on the previous batch. As a result, the amount of fingerprints transmitted over the network can be greatly reduced.

Figure 6:
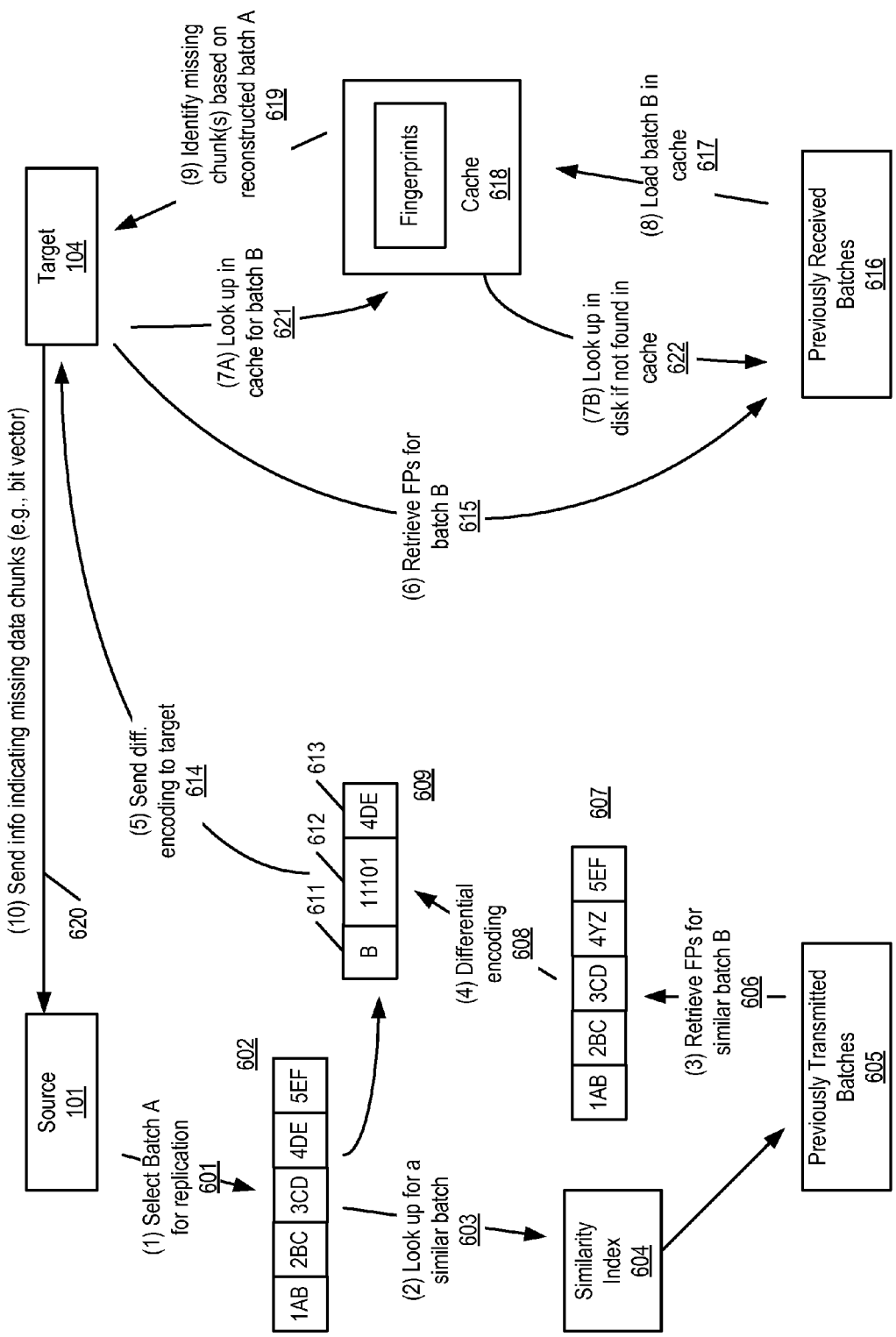
FIG. 6 is a processing diagram illustrating a process of optimizing metadata for network replication according to another embodiment of the invention.

FIG. 6 is a processing diagram illustrating a process of optimizing metadata for network replication according to another embodiment of the invention. Referring to FIG. 6, when source 101 is to replicate a batch or group of data chunks to target 104, source 101 identifies via transaction 601 fingerprints 602 of the batch (e.g., a first batch). A batch may represent one or more data chunks of a file or a directory of one or more files (e.g., backup or archive file). Using the example described above, fingerprints 602 includes 1AB, 2BC, 3CD, 4DE, and 5EF. Based on fingerprints 602, source 101 identifies via transaction 603 a similar batch that has been previously transmitted to target 104. In one embodiment, source 101 maintains a similarity index 604 that stores information referencing to a batch that may be similar to another batch based on certain signature or pattern of one or more fingerprints.

The source may maintain multiple versions of a given file (e.g., backups, snapshots, archives, etc.). A previous version may have a similar batch. A similar batch may be at the same offset in the previous version. Because the additions and deletions, the similar batch may be at a different position. A similar batch can be identified by a variety of techniques such as creating an index of sampled metadata such as fingerprints and checking that index. Additions and deletions may have been tracked when they look place so offsets for similar batches can be calculated.

According to one embodiment, without assuming a previous batch holds the most similar fingerprints, a similar batch can be identified through a similarity index covering the entire storage system. A representative fingerprint can be used to represent a batch, which may be selected based on criteria as described above. A sketch may also be created to represent a batch, where a sketch may be created based on selected one or more fingerprints and applying a function to those selected fingerprints. Further, instead of representing each batch in the index, each file could be represented in the index and similar batches can be found within that file.

In one embodiment, processing logic select one of the fingerprints 602 as a representative fingerprint, such as, for example, fingerprint 3CD as described above. Based on the representative fingerprint, processing logic performs a lookup in similarity index 604 which is indexed based on fingerprints. Based on the representative fingerprint, processing logic identifies a batch ID representing one of the previously transmitted batches 605. The fingerprints of the identified batch (e.g., a second batch) are then identified and retrieved via transaction 604, in this example, fingerprints 607. Based on fingerprints 602 of the current batch and fingerprints 607 of the previous batch (also referred to as a base batch), processing logic performs a differential encoding operation via transaction 608 to generate differential encoding information 609.

Alternatively, processing logic may construct a sketch of the fingerprints, for example, by performing a predetermined mathematical function or hash function on the fingerprints of the current batch. Based on the fingerprint sketch, processing logic performs a lookup in the similarity index that is indexed based on the sketches.

In this example, all fingerprints between fingerprints 602 and fingerprints 607 are identical except the fourth fingerprint from the left (e.g., 4DE of batch A vs. 4YZ of batch B). Differential encoding information 609 includes a batch ID 611 identifying a previously transmitted batch (in this example, batch B), a bit vector 612 indicating which of the fingerprints that have been previously transmitted to target 104, and actual fingerprint(s) 613 that has not been transmitted to target 104 and indicated in bit vector 612. Differential encoding information 609 is then transmitted via transaction 614 to target 104. If a similar batch is not found, then the standard batch of full fingerprints is sent. Alternative differential encodings are possible. In one embodiment, when most of the fingerprints match between batches A and B, it may create a network savings for a different data structure to be used such that the encoding lists the offsets of the missing fingerprints instead of using a bit vector that indicates both present and missing fingerprints. In this example, the alternative encoding would be (B, 4, and 4DE) indicating batch B is the base, the fourth fingerprint is missing, and the missing fingerprint is 4DE. In another embodiment, if a differential encoding is found not to be smaller than sending the standard batch of fingerprints, the transfer technique may send the standard batch of fingerprints.

In response, target 104 decodes differential encoding information 609 and locates via transaction 615 batch B from the previously received batches 616 based on batch ID 611. The fingerprints of batch B are then loaded into a memory such as cache 618. The fingerprints of batch B indicated by bit vector 612 and fingerprint(s) 613 are then used to reconstruct the fingerprints of batch A. Alternatively, in response to information 609, target 104 may check whether the fingerprints of batch B have already been loaded in cache 618 via transaction 621. If not, target 104 then accesses the previously received batches 616 on disk via transaction 622. Target 104 then determines via transaction 619 any of the data chunks are missing at target 104. If there is any missing data chunks, target 104 sends the information indicating which of the data chunks are missing via transaction 620. The information could be just a bit vector indicating the missing data chunks or the list of missing full fingerprints. Thereafter, source 101 sends the missing data chunks as described above.

A batch may be a segment within a particular file. In one embodiment, batch ID 611 may include information identifying that file such as a filename, a location within the file such as an offset, and a size of the batch, etc. Alternatively, the batch ID may include information identifying a container and offset, if source 101 and target 104 are known to have exactly matching containers. Batches can also be referenced based on an index from key to batch that exists on both source 101 and target 104, where a key could be a selected fingerprint.

Figure 7:
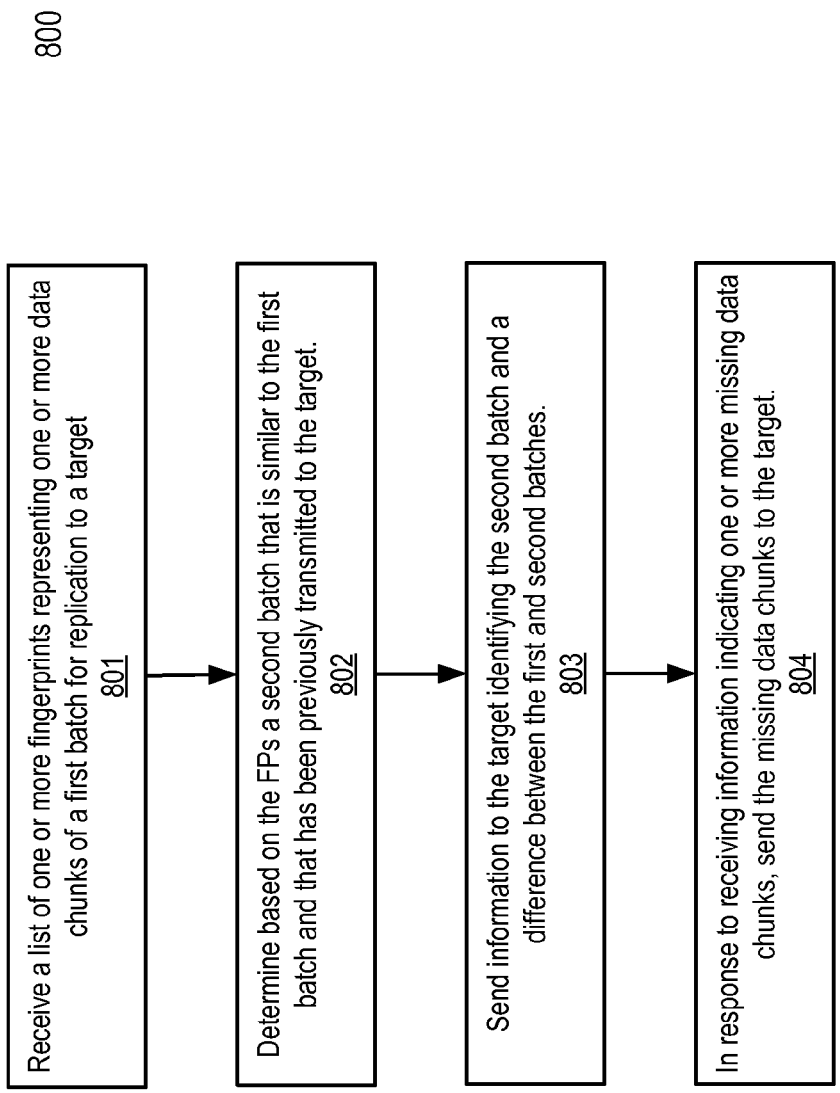
FIG. 7 is a flow diagram illustrating a method for optimizing metadata for network replication according to another embodiment of the invention.

FIG. 7 is a flow diagram illustrating a method for optimizing metadata for network replication according to another embodiment of the invention. Method 800 may be performed by source 101 of FIG. 6, which may include processing logic in software, hardware, or a combination thereof. Referring to FIG. 7, at block 801, processing logic receives a list of one or more fingerprints representing one or more data chunks of a first batch (e.g., current batch) to be replicated from a source to a target over a network. The data chunks may represent at least a portion of a file or a directory of one or more files. The data chunks may be deduplicated data chunks. At block 802, processing logic determines a second batch that is similar to the first batch and has been previously transmitted to the target. At block 803, processing logic sends information to the target identifying the second batch and a difference of fingerprints between the first batch and the second batch, without sending all full fingerprints of the first or second batch. The information includes a batch identifier identifying the second batch, a bit vector indicating which of the fingerprints that the second batch is missing, and the actual missing fingerprint(s). The information is used by the target to reconstruct or recover the fingerprints of the first batch based on the second batch's fingerprints and the difference between the fingerprints of two batches. At block 804, in response to receiving information received from target indicating one or more missing data chunks at the target, processing logic sends the missing data chunks to the target for replication.

Figure 8:
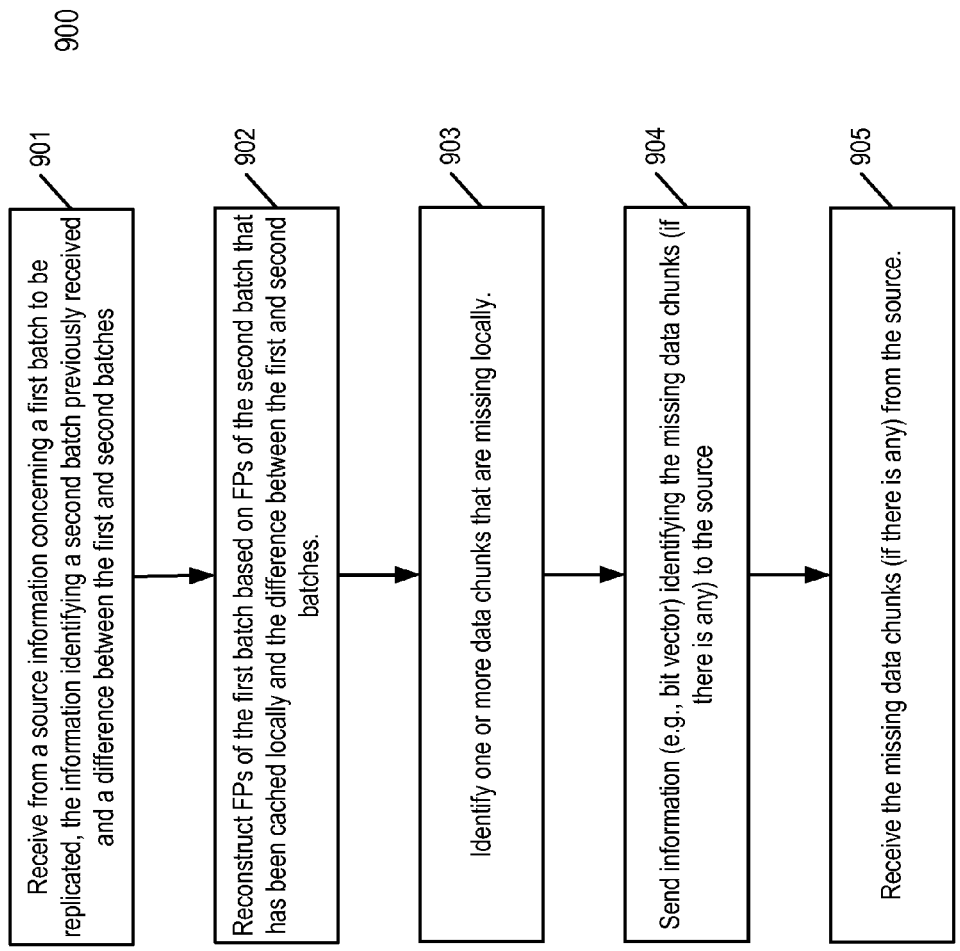
FIG. 8 is a flow diagram illustrating a method for optimizing metadata for network replication according to another embodiment of the invention.

FIG. 8 is a flow diagram illustrating a method for optimizing metadata for network replication according to another embodiment of the invention. Method 900 may be performed by target 104 of FIG. 6, which may include processing logic in software, hardware, or a combination thereof. Referring to FIG. 8, at block 901, processing logic receives from a source information concerning a first batch of data chunks to be replicated to a target, where the information identifies a second batch that was previously received and a difference between fingerprints of the first batch and the second batch. For example, the information may include a batch identifier identifying the second batch, a bit vector indicating which of the fingerprints that may be missing from the second batch, and the actual missing fingerprint(s). At block 902, processing logic locates the second batch and retrieves the fingerprints of the second batch. It then reconstructs the fingerprints of the first batch using the fingerprints of the second batch and the missing fingerprints sent from the source. At block 903, processing logic determines any data chunks that are missing at the target. At block 904, processing logic sends information to the source identifying which of the data chunks are missing. At block 905, processing logic receives the missing data chunks from the source.

FIG. 9 is a block diagram illustrating a deduplication storage system according to one embodiment of the invention. For example, deduplication storage system 1000 may be implemented as part of a deduplication storage system as described above, such as source or target storage system of FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients such as a client application or backup software located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 1010 may be organized into one or more volumes of Redundant Array of Inexpensive Disks (RAID). Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of data chunks, or a container of one or more CRs. Fingerprints are mapped to a particular data object via metadata 1016, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace of a file system associated with the deduplication storage engine 1001. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software, hardware, or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for replicating data over a network, the method comprising:
   in response to a list of a plurality of fingerprints representing a plurality of data chunks to be replicated from a source storage system to a target storage system over a network, selecting one of the fingerprints as a representative fingerprint that matches a selection criteria;

generating, at the source storage system, a fingerprint representation for each of the plurality of fingerprints, wherein a fingerprint representation contains only a portion of the corresponding fingerprint, and wherein the representative fingerprint is a full fingerprint;

transmitting the representative fingerprint and the fingerprint representations to the target storage system over the network, without transmitting all full fingerprints of the data chunks, to allow the target storage system identifying which of the data chunks are missing;

receiving a response from the target storage system in response to the representative fingerprint and the fingerprint representations, the response including a bitmask having a plurality of bits each indicating whether one of the fingerprints is missing at the target storage system;

in response to the response, transmitting one or more fingerprints that are missing to the target storage system based on the bitmask, such that a network bandwidth required to transmit the fingerprints of the data chunks from the source storage system to the target storage system over the network is reduced; and in response to information received from the target storage system indicating one or more data chunks that are missing at the target storage system, transmitting the missing data chunks to the target storage system.

2. The method of claim 1, wherein a fingerprint is selected as a representative fingerprint if the fingerprint matches a predetermined pattern and has high probability of existing at the target storage.

3. The method of claim 1, wherein a fingerprint representation is generated based on a portion of the corresponding fingerprint.

4. The method of claim 1, further comprising:

receiving from the target storage system a first hash value generated by the target storage system by hashing one or more fingerprints indicated by the bitmask that the target storage system already has;

hashing the one or more fingerprints indicated by the bitmask at the source storage system to generate a second hash value; and comparing the first hash value with the second hash value to confirm that the target storage system indeed has the fingerprints indicated by the bitmask.

5. The method of claim 4, further comprising:

transmitting only the missing fingerprints to the target storage system if the first and second hash values match; and transmitting entire full fingerprints to the target storage system if the first and second hash values do not match.

6. The method of claim 1, wherein the representative fingerprint and the fingerprint representations are utilized by the target storage system to reconstruct the full fingerprints of the data chunks to determine whether any of the data chunks exist on the target storage system.

7. The method of claim 6, wherein the target storage system is configured to identify a container based on the representative fingerprint, wherein the container is one of a plurality of containers associated with the target storage system for storing data chunks, retrieve fingerprints from the container and caching the fingerprints of the container in a cache memory, and determine whether the fingerprints of the container include fingerprints represented by the fingerprint representations received from the source storage system.

8. The method of claim 7, wherein the target storage system is further configured to generate a bitmask having a plurality of bits each corresponding to one of the fingerprints represented by the fingerprint representations, each bit being configured to a bit value indicating whether the corresponding fingerprint exists at the target storage system, generate a hash value by hashing fingerprints that exist in the target storage system, and transmit the bitmask and the hash value to the source storage system to allow the source storage system to confirm whether the target system has at least some of the fingerprints.

9. A non-transitory machine-readable medium having instructions stored therein, which when executed by a processor, cause the processor to perform operations for replicating data over a network, the operations comprising:

in response to a list of a plurality of fingerprints representing a plurality of data chunks to be replicated from a source storage system to a target storage system over a network, selecting one of the fingerprints as a representative fingerprint that matches a selection criteria;

generating, at the source storage system, a fingerprint representation for each of the plurality of fingerprints, wherein a fingerprint representation contains only a portion of than the corresponding fingerprint, and wherein the representative fingerprint is a full fingerprint;

transmitting the representative fingerprint and the fingerprint representations to the target storage system over the network, without transmitting all full fingerprints of the data chunks, to allow the target storage system identifying which of the data chunks are missing;

receiving a response from the target storage system in response to the representative fingerprint and the fingerprint representations, the response including a bitmask having a plurality of bits each indicating whether one of the fingerprints is missing at the target storage system;

in response to the response, transmitting one or more fingerprints that are missing to the target storage system based on the bitmask, such that a network bandwidth required to transmit the fingerprints of the data chunks from the source storage system to the target storage system over the network is reduced; and in response to information received from the target storage system indicating one or more data chunks that are missing at the target storage system, transmitting the missing data chunks to the target storage system.

10. The medium of claim 9, wherein a fingerprint is selected as a representative fingerprint if the fingerprint matches a predetermined pattern and has high probability of existing at the target storage.

11. The medium of claim 9, wherein a fingerprint representation is generated based on a portion of the corresponding fingerprint.

12. The medium of claim 9, wherein the operations further comprise:

receiving from the target storage system a first hash value generated by the target storage system by hashing one or more fingerprints indicated by the bitmask that the target storage system already has;

hashing the one or more fingerprints indicated by the bitmask at the source storage system to generate a second hash value; and comparing the first hash value with the second hash value to confirm that the target storage system indeed has the fingerprints indicated by the bitmask.

13. The medium of claim 12, wherein the operations further comprise:

transmitting only the missing fingerprints to the target storage system if the first and second hash values match; and
transmitting entire full fingerprints to the target storage system if the first and second hash values do not match.

14. The medium of claim 9, wherein the representative fingerprint and the fingerprint representations are utilized by the target storage system to reconstruct the full fingerprints of the data chunks to determine whether any of the data chunks exist on the target storage system.

15. The medium of claim 14, wherein the target storage system is configured to
identify a container based on the representative fingerprint, wherein the container is one of a plurality of containers associated with the target storage system for storing data chunks,
retrieve fingerprints from the container and caching the fingerprints of the container in a cache memory, and
determine whether the fingerprints of the container include fingerprints represented by the fingerprint representations received from the source storage system.

16. The medium of claim 15, wherein the target storage system is further configured to
generate a bitmask having a plurality of bits each corresponding to one of the fingerprints represented by the fingerprint representations, each bit being configured to a bit value indicating whether the corresponding fingerprint exists at the target storage system,
generate a hash value by hashing fingerprints that exist in the target storage system, and
transmit the bitmask and the hash value to the source storage system to allow the source storage system to confirm whether the target system has at least some of the fingerprints.

17. A data processing system, comprising:
a processor; and
a memory coupled to the processor storing instructions, which when executed by the processor, cause the processor to
in response to a list of a plurality of fingerprints representing a plurality of data chunks to be replicated to a target storage system over a network, select one of the fingerprints as a representative fingerprint that matches a selection criteria,
generate a fingerprint representation for each of the plurality of fingerprints, wherein a fingerprint representation contains only a portion of the corresponding fingerprint, and wherein the representative fingerprint is a full fingerprint,
transmit the representative fingerprint and the fingerprint representations to the target storage system over the network, without transmitting all full fingerprints of the data chunks, to allow the target storage system identifying which of the data chunks are missing,
receive a response from the target storage system in response to the representative fingerprint and the fingerprint representations, the response including a bitmask having a plurality of bits each indicating whether one of the fingerprints is missing at the target storage system,
in response to the response, transmit one or more fingerprints that are missing to the target storage system based on the bitmask, such that a network bandwidth required to transmit the fingerprints of the data chunks from the source storage system to the target storage system over the network is reduced, and
in response to information received from the target storage system indicating one or more data chunks that are missing at the target storage system, transmit the missing data chunks to the target storage system.

18. The system of claim 17, wherein a fingerprint is selected as a representative fingerprint if the fingerprint matches a predetermined pattern and has high probability of existing at the target storage.

19. The system of claim 17, wherein a fingerprint representation is generated based on a portion of the corresponding fingerprint.

20. The system of claim 17, wherein the processor is further to:
receive from the target storage system a first hash value generated by the target storage system by hashing one or more fingerprints indicated by the bitmask that the target storage system already has,
hash the one or more fingerprints indicated by the bitmask at the source storage system to generate a second hash value, and
compare the first hash value with the second hash value to confirm that the target storage system indeed has the fingerprints indicated by the bitmask.

21. The method of claim 20, wherein the processor is further to:
transmit only the missing fingerprints to the target storage system if the first and second hash values match, and
transmit entire full fingerprints to the target storage system if the first and second hash values do not match.

* * * * *